United States Patent [19]

Hicks

[11] Patent Number: 4,645,174
[45] Date of Patent: Feb. 24, 1987

[54] MOUNTING ARRANGEMENT FOR A CRITICAL FLOW DEVICE

[75] Inventor: Irwin A. Hicks, Radnor, Pa.
[73] Assignee: American Meter Company, Philadelphia, Pa.
[21] Appl. No.: 734,937
[22] Filed: May 16, 1985
[51] Int. Cl.[4] .............................................. G01F 25/00
[52] U.S. Cl. ............................................... 251/5; 73/3; 251/61.1; 251/117
[58] Field of Search ............... 251/61.1, 117, 120, 251/5; 137/599, 599.1; 73/3; 138/45

[56] References Cited

U.S. PATENT DOCUMENTS

| | | | |
|---|---|---|---|
| 136,746 | 3/1873 | McMahon | 137/599 X |
| T857,046 | 12/1968 | Cobb et al. | 73/3 |
| 1,298,471 | 3/1919 | Dodge | |
| 1,559,155 | 10/1925 | Bullock | |
| 2,764,891 | 10/1956 | McGowen, Jr. | |
| 2,898,088 | 8/1959 | Alder | 251/5 X |
| 3,177,699 | 4/1965 | Lingquist et al. | 73/3 |
| 3,469,442 | 9/1969 | Brueckner | 73/3 |
| 3,483,892 | 12/1969 | Sugimura et al. | 251/61.1 X |
| 3,836,113 | 9/1974 | Johnson | 251/5 |
| 4,130,128 | 12/1978 | Kaneko | 251/207 X |
| 4,187,872 | 2/1980 | Freeman et al. | 137/599 X |
| 4,497,468 | 2/1985 | Hubbard et al. | 251/117 |
| 4,519,574 | 5/1985 | Röper | 137/599 X |

*Primary Examiner*—Martin P. Schwadron
*Assistant Examiner*—Stephen M. Hepperle
*Attorney, Agent, or Firm*—David L. Davis; Robert E. Smith; Edward L. Bell

[57] ABSTRACT

An axial flow valve has its cage bolt replaced by a sonic nozzle. This device may then be permanently installed in a pipeline in series with a meter to provide the facility for on site calibration of the meter.

5 Claims, 11 Drawing Figures

MOUNTING ARRANGEMENT FOR A CRITICAL FLOW DEVICE

BACKGROUND OF THE INVENTION

This invention relates to gas flow measurement and, more particularly, to an arrangement for mounting a critical flow device in a gas pipeline for on-site calibration of a gas meter.

The rapidly increasing cost of natural gas since the 1970's has caused profound changes in attitudes towards meter accuracy, especially when gas at high pressure is involved. Since gas pricing has doubled or tripled in real (non-inflated) terms, and has multiplied by 10 to 15 times in inflated currency, there is a significant desire to obtain much more accurate measurement than contemporary meters are able to obtain or maintain. The relative price of natural gas to other fuels, long depressed due to regulatory restraint, is now approaching parity with alternate fuels, assuring even higher interest in accurate measurement. However, all volumetric meters measure actual volume. Thus, meters operating at higher pressures are no more accurate, and are generally significantly less accurate, because calibration is generally performed at or near atmospheric pressure. At higher operating pressures, a given meter can handle an enormous amount of gas, and yet accuracy of the meter is less predictable. To appreciate the cost of such inaccurracy, as an example, if the cost of gas is $5.00 per thousand standard cubic feet, a twelve inch pipeline operating at 900 psig will have an annual error cost of $3,450,000 for only 1% error of the meter. Since meters are seldom better in point accuracy than ±1% error at various pressures, even when calibrated under laboratory conditions, and actual field conditions can cause significantly greater error, it is apparent that uncalibrated meters are inadequate in precision of measurement for larger pipelines and higher pressures. It is therefore a primary object of this invention to provide a highly accurate measurement standard coupled with the meter, on site, so that the standard can be used to calibrate the meter under actual conditions.

It is another object of this invention to provide a calibration standard which is capable of establishing the precise flow rate, on site, for various pressures and various rates of flow, as the meter inaccuracy changes as a function of pressure, flow rate, and pipeline conditions.

A critical flow device is a secondary proving standard that has been proven to correlate extremely well with primary testing standards such as the proving bell. Carefully controlled laboratory correlations with huge proving bells have established critical flow devices, also referred to as sonic nozzles, as an excellent, commercially available standard. Sonic nozzles are highly accurate, can be certified on huge proving bells, are permanent (relatively immune to wear and erosion), are compact, portable, and relatively easy to recalibrate. They operate over wide ranges of temperature and pressure on any type of gas mixture. If the sonic nozzle is mounted immediately downstream from the meter to be calibrated, the test pressure need only be fairly constant. It is therefore a further object of this invention to provide an on-site meter calibration arrangement utilizing a sonic nozzle.

In the past, such devices have only been used for laboratory calibration or used as a field calibration standard by temporary insertion into the pipeline. The major reason for temporary insertion is that at any test flow rate other than 100% of demand, it is necessary to bypass (unmetered) the nozzle to fulfill pipeline demand. Further, the sonic nozzle has a pressure absorption ranging from 5% to 20%, depending on the recovery cone design. Both characteristics preclude permanent installation without extra valving as an in-line calibration standard. On the other hand, because meter accuracy varies with pipeline conditions, flow rate, pressure and usage, it would be highly desirable to leave such a sonic device in the pipeline for the purpose of initial calibration and on-site recalibration. It is therefore still another object of this invention to provide an arrangement whereby a sonic nozzle used for meter calibration can be permanently installed in a pipeline.

SUMMARY OF THE INVENTION

The foregoing and other objects of this invention are attained in accordance with the principles of this invention by providing a valve having an inlet and an outlet, a critical flow device, and means for mounting the critical device in the valve so that when the valve is closed to otherwise block flow from the inlet to the outlet the critical flow device is in position so that all flow is directed from the inlet to the outlet through the critical flow device.

In accordance with one aspect of this invention, the valve is an expandable sleeve axial flow valve and the mounting means is arranged to support the critical flow device substantially along the central axis of the valve to provide a flow path therethrough independent of the state of the sleeve.

In accordance with a further aspect of this invention, the mounting means further include means for accommodating selected sizes of critical flow devices.

BRIEF DESCRIPTION OF THE DRAWINGS

The foregoing will be more readily apparent upon reading the following description in conjunction with the drawings wherein.

DETAILED DESCRIPTION

Figure 1:
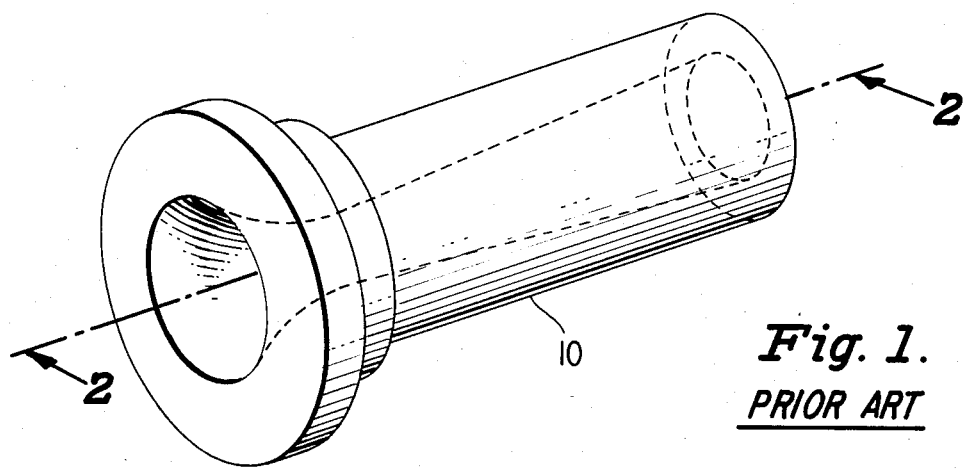
FIG. 1 is a perspective view of an illustrative sonic nozzle.
Figure 2:
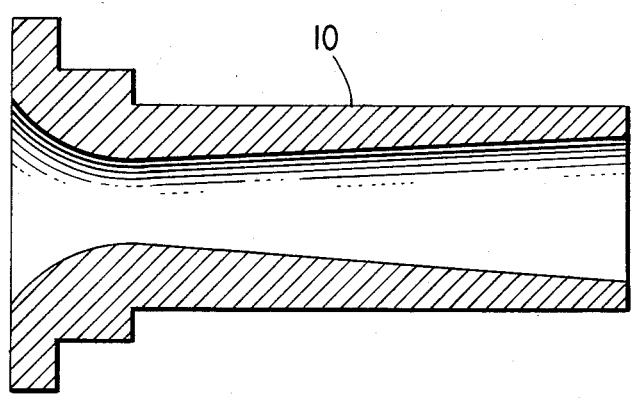
FIG. 2 is a sectional view of the sonic nozzle of FIG. 1, taken along the line 2—2 in FIG. 1.
Figure 3:
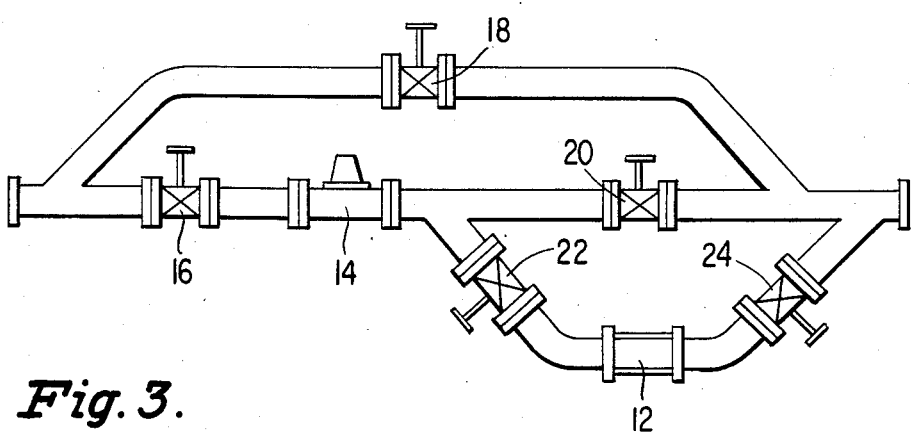
FIG. 3 is a piping schematic diagram showing how the sonic nozzle of FIGS. 1 and 2 may be installed in a pipeline in accordance with conventional practice.

Referring now to the drawings, wherein like elements in different figures thereof have the same reference character applied thereto, FIGS. 1 and 2 show a sonic nozzle, designated generally by the reference numeral 10, of conventional design and which is adapted to be inserted in a pipeline, as shown schematically in FIG. 3, for on site calibration of a meter. The sonic nozzle 10 is designed for installation in a holder 12 and, as is well known, is a device that places an upper limit on the gas flow therethrough to a specific flow rate irrespective of the pressure differential across the device. Thus, when such a device is installed in a pipeline, the flow rate is precisely known and when multiplied by time of flow, this resultant flow volume may be compared with the volume registered by a meter under test.

FIG. 3 shows an illustrative piping arrangement for utilizing a sonic nozzle within a holder 12 for testing a meter 14. As shown in FIG. 3, the valves 16, 18, 20, 22 and 24 must be provided to satisfy all possible operating conditions. Thus, for normal metering, the valves 16 and 20 must be open with the valves 18 and 22 or 24 closed. For calibration, the valve 20 must be closed, the valves 16, 22 and 24 must be open and the valve 18 may be partially opened to satisfy downstream requirements during calibration, but maintaining the critical differential pressure across the sonic nozzle in the holder 12. This arrangement possesses the disadvantage, among others, that high pressure piping must be opened to replace one critical flow device with a different sized critical flow device. Opening the piping not only involves considerable labor, but leak-free resealing is essential. It should be noted that three sizes of critical flow devices are advisable—one at or near the operating capacity of the meter, one at ten percent of the operating capacity, and one at fifty percent of the operating capacity—so that the piping would be opened three times per calibration or recalibration. Alternatively, the opening problem can be obviated by another piping arrangement (not shown) which provides valving and lines to two sonic devices in parallel, since when two sonic devices are used in parallel, the result is a third rate with no reduction in accuracy. However, the disadvantage with this arrangement is the cost of piping and the number of expensive valves. A secondary disadvantage is the somewhat complicated valve operation protocol and the difficulty of operating several valves in concert when changing the function, in order to avoid disruption to the downstream piping which may cause fault protection to activate. The present invention provides a simple means of inserting a critical flow device in series with a meter to minimize piping and valve requirements.

Figure 4A:
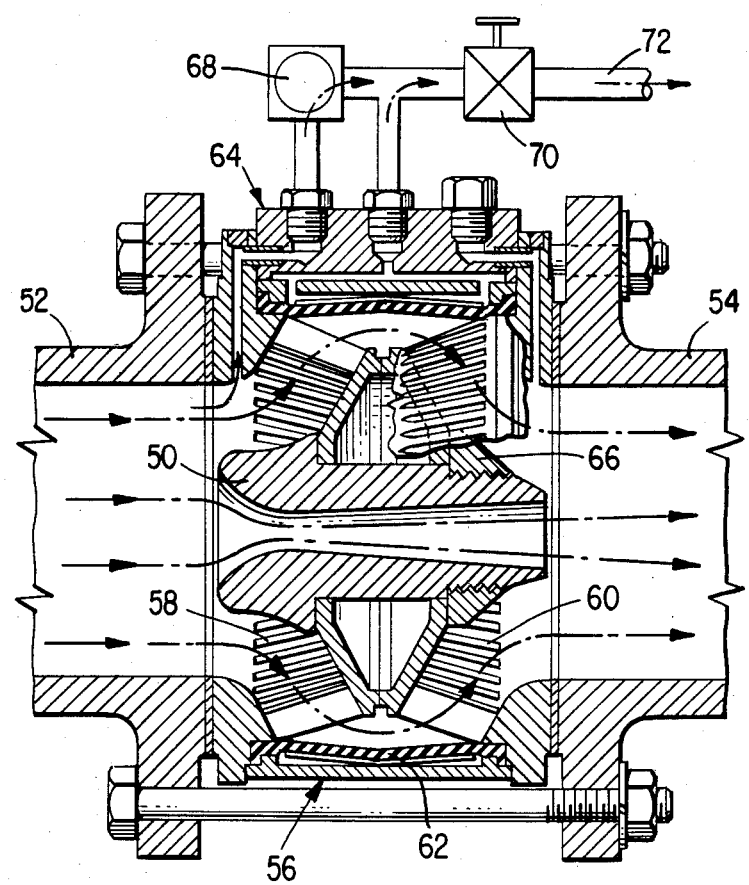
FIG. 4A shows an arrangement in accordance with the present invention wherein a sonic nozzle is installed in an axial flow valve, the axial flow valve being shown in the open condition.
Figure 4B:
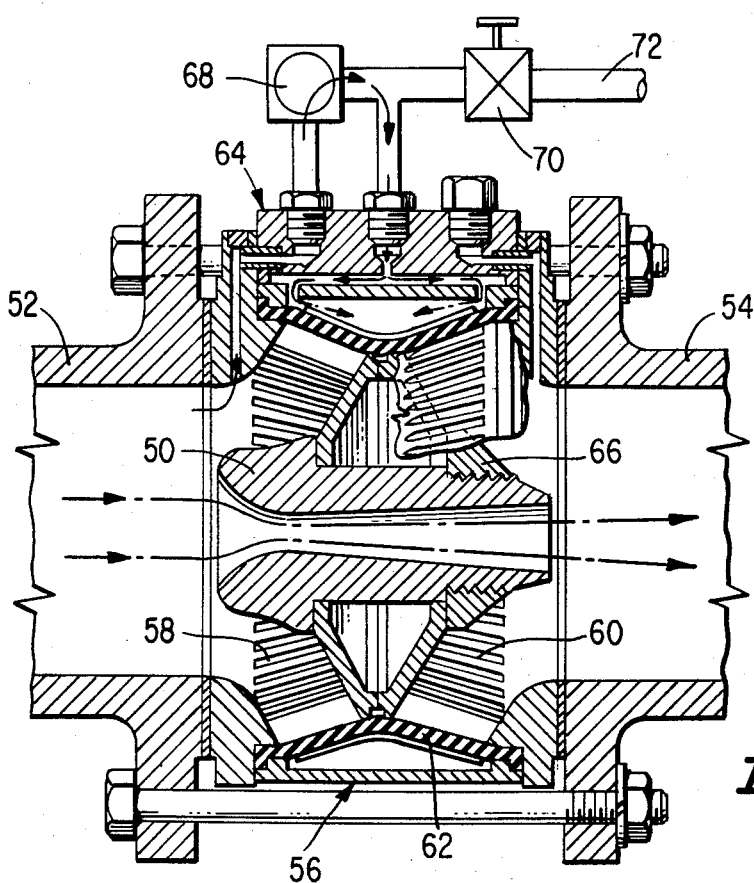
FIG. 4B is a view similar to FIG. 4A showing the axial flow valve in the closed condition.

In accordance with the principles of this invention, a sonic nozzle may be mounted in a valve to overcome all of the aforementioned disadvantages. The combination of a sonic nozzle mounted in a valve will be hereinafter referred to as a "sonic monitor". A preferred type of valve which may be modified to practice this invention is disclosed in U.S. Pat. No. 3,836,113, the contents of which are hereby incorporated by reference. This valve is known as an expandable sleeve axial flow valve. Such a valve is a device which inserts between pipe flanges and acts as a very high capacity, quiet and compact valve for pressures up to 1500 psig. The operating principle is that an expandable sleeve of resilient material is positioned within a housing on a pair of cage members of conical shape having slots therethrough. In its free state, the sleeve seals the slots of the cage members. When the pressure behind the sleeve is reduced, the sleeve is caused to expand away from the slots to allow gas to pass through the slots and between the sleeve and the cages. As shown in FIGS. 4A and 4B, a critical flow device 50, preferably a sonic nozzle having pressure recovery, replaces the cage bolt of a conventional axial flow valve. As shown in FIG. 4A, and described in detail in the referenced patent, the axial flow valve is interposed within a fluid line 52-54 and includes an outer cylindrical body 56, a pair of substantially identical slotted cages 58 and 60, and a resilient expandable sleeve 62 positioned around the cages 58 and 60. A manifold 64 is welded to the outer periphery of the body 56. The cages 58 and 60 are secured together by means of the sonic nozzle 50 and a fairing nut 66 threaded onto external threads provided on the downstream end of the sonic nozzle 50.

A valve control loop is connected to the manifold 64. This control loop comprises a restrictor 68 and a pilot valve 70. The restrictor 68 is coupled between the inlet to the valve and the control chamber at the exterior of the sleeve 62. The pilot valve 70 is connected between the control chamber at the exterior of the sleeve 62 and a low pressure control loop dump. A typical installation of the inventive arrangement is downstream from a meter being calibrated, which meter is at a regulating station. Accordingly, the control loop dump would be a line 72 which goes to the other side of the distribution regulator. Alternatively, the line 72 could be open to the atmosphere.

As shown in FIG. 4A, with the pilot valve 70 open, upstream gas is allowed to flow through the sonic nozzle 50, through the axial flow valve, and through the control loop (all in parallel). The net result is that in this condition, there is a relatively low pressure drop across the device, making it suitable for mounting in series with the meter.

As shown in FIG. 4B, with the pilot valve 70 closed, the inlet pressure pressurizes the exterior of the sleeve 62. Accordingly, the flow through the control loop and through the valve to downstream is cut off, leaving only the flow through the sonic nozzle 50. If the pressure differential across the sonic nozzle is such that the nozzle discharge absolute pressure is less than 80% to 90% of the absolute upstream pressure, this pressure differential is sufficient that the sonic nozzle 50 goes to critical flow (sonic), providing a very precise flow rate (based on temperature and gas composition). In this condition, the sonic nozzle 50 can be utilized to calibrate meters at any pressure.

Figure 5:
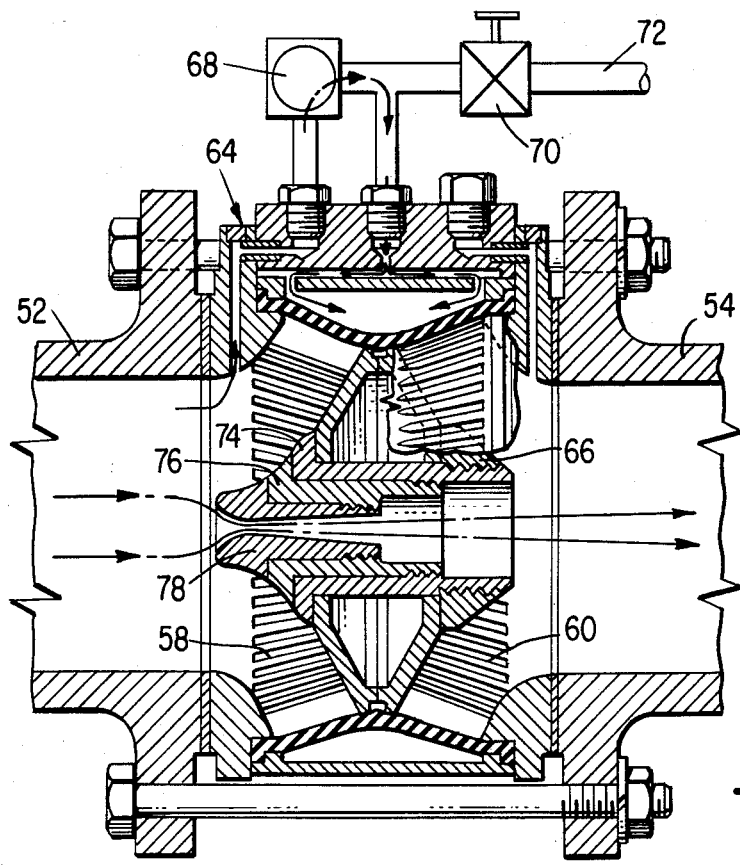
FIG. 5 illustrates a modification of the arrangement shown in FIGS. 4A and 4B showing how different size sonic nozzles may be accommodated.

FIG. 5 shows an arrangement wherein different size sonic nozzles may be accommodated in one axial flow valve. The reason for providing such an arrangement is due to the fact that there commonly are six sizes of axial flow valves (two inch, three inch, four inch, six inch, eight inch and twelve inch) each matching a common pipe size. If sonic nozzles were manufactured for each size axial flow valve, there could be a considerable number of parts. While any given meter might only require three sonic nozzles for calibration, the range of the types of meters that might have to be accommodated (diaphragm rotary, turbine or orifice meter) might be as many as six to eight. Thus, there is the potential over the six sizes of axial flow valves to have thirty-six to forty-eight sonic nozzles. It would be a great disadvantage to have to inventory such quantities. Accordingly, as shown in FIG. 5, a nesting arrangement for the nozzles has been devised. Thus, in place of the sonic nozzle 50 (FIG. 4A) an adaptor 74 is installed with the fairing nut 66. The adaptor 74 has internal threads for accommodating either the next smaller size sonic nozzle or, alternatively, a smaller adaptor 76. The adaptor 76 holds the sonic nozzle 78. Alternatively, a smaller adaptor and smaller sonic nozzle could be nested within the adaptor 76. It is apparent that this nesting arrangement results in an efficient reduction of required inventory.

It should be noted that having the sonic nozzles permanently in the gas stream, and therefore subject to gas borne particles and materials, is of no concern. While orifice meter plates are very susceptible to edge rounding, and therefore severe loss of accuracy, sonic nozzles are virtually immune to such abuse. A sonic nozzle can have severe pitting and abrasion of the inlet face but will maintain calibration because the throat is completely unharmed. The phenomenon of unscathed throat can be explained by the streamlines of gas flow into the throat wherein a predictable boundary layer which obviates impingement on the throat is always maintained.

Figure 6:
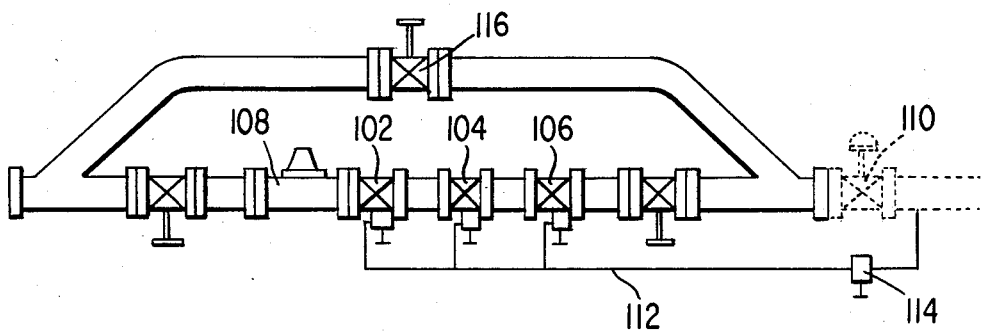
FIG. 6 shows an illustrative piping schematic diagragm illustrating the installation in a pipeline of a device according to this invention.

With the arrangement according to this invention in series with the meter, the piping and valve arrangement of a calibration facility is highly simplified and less costly. The labor to perform a calibration is also greatly reduced as only one person is required to close a given axial flow valve and control the bypass valve (to obtain the pressure differential to cause critical flow while also bypassing sufficient gas to maintain downstream requirements). FIG. 6 shows an illustrative piping arrangement. As shown in FIG. 6, there are three sonic monitors 102, 104 and 106 in series with a meter 108. As is typical, the meter 108 is upstream from a distribution regulator 110. The dump line 112 from the sonic monitors 102, 104 and 106 goes to the downstream side of the regulator 110 through a valve 114. For normal metering, the bypass valve 116 is closed and all of the other valves are open. For calibration purposes, the bypass valve 116 is partially open to satisfy downstream requirements and the selected one of the pilot valves for the sonic monitors 102, 104 and 106 is closed. It should be noted that a metering station as normally arranged would have all of the piping and valving as shown in order to be able to remove the meter for calibration or replacement, excepting the three sonic monitors 102, 104 and 106, two pipe spools, and piping in the bypass equal to the added length due to the three sonic monitors. Thus, this arrangement is very compact and does not require any additional and expensive valves. It is clearly the least expensive method of providing on-site calibration and recalibration and opening the pipeline is avoided. Downstream pressure is also much easier to control during a calibration run as the tester can close one of the sonic monitor control loops which have long time "decay" (from the loop restrictor) so that full attention can be given to the setting of the bypass valve 116.

Figure 7A:
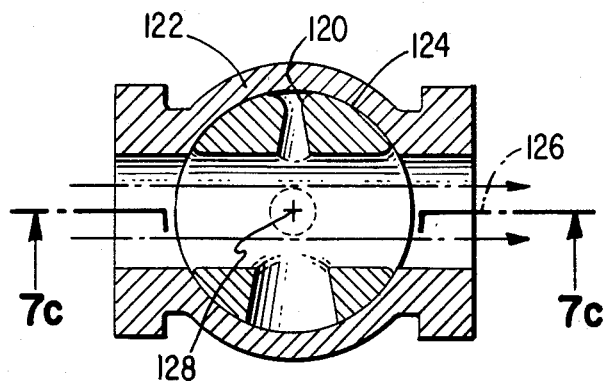
FIGS. 7A, 7B, and 7C illustrate the present invention incorporated in a ball valve.
Figure 7B:
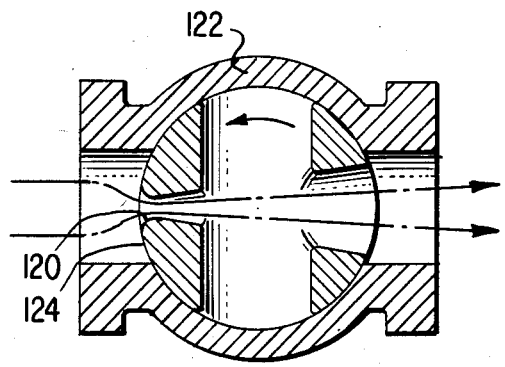
Figure 7C:
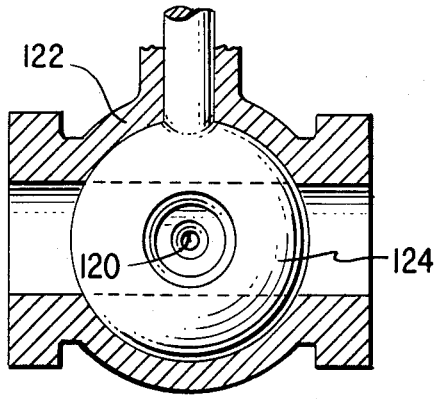

While it is preferred to incorporate a sonic device into an axial flow valve, it is also contemplated that a sonic device could be put into any valve. FIGS. 7A, 7B and 7C illustrate a sonic device 120 installed in a ball valve 122 in the ball 124 perpendicular to the open port axis 126 and the axis of rotation 128 such that the valve would be full open when the port is open and in calibration mode when the port is fully closed. While this would appear to have the advantage of protecting the sonic device during normal operation, such protection is unnecessary. The disadvantage of this approach is the use of a very expensive ball valve as the nozzle or nozzle holder. It is also possible to arrange the port and sonic device so that a third valve position (full cut off of flow) is obtained by reducing the port diameter and putting the sonic device on an axis sixty degrees from the port axis (the shut off position being on an axis sixty degrees from the sonic axis). It is also possible to put the sonic device in a tube (strut) whose length is nearly the ball diameter. The advantage would be ease of removing the standard from the valve for replacement and calibration and pressure recovery would likely be better due to the significantly increased recovery cone length.

Figure 8:
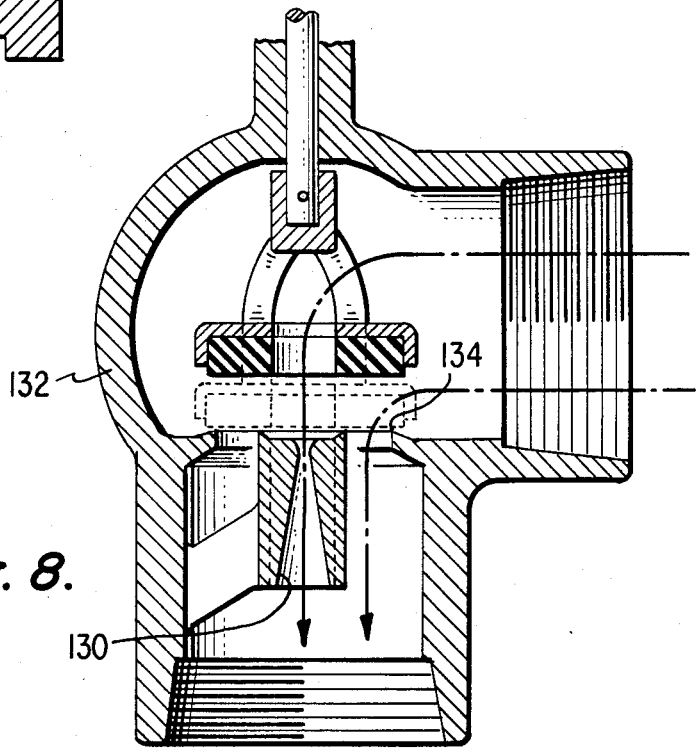
FIG. 8 illustrates the present invention incorporated in a globe valve.

FIG. 8 illustrates a sonic device 130 installed in a globe or angle valve 132 where the sonic device is built into the seat orifice 134.

While not shown, plate valves (gate, swing plate, and swing check) could easily be adapted to have the sonic device mounted in the plate.

At this point, it is appropriate to summarize some of the advantages of utilizing sonic monitors as might be configured in FIG. 6. Any meter that has excellent repeatability of measurement can be point calibrated to ±0.25% maximum error at any pressure, on site. Errors of measurement due to factory calibration are eliminated. Errors of measurement due to inaccurate high pressure test stands are eliminated. Errors of measurement due to a specific pressure causing a shift from factory calibration are eliminated. Errors of measurement due to varying flow rate changing point accuracy are eliminated. Errors of measurement due to pipeline conditions (turbulence, jetting and swirling) are eliminated. Errors of measurement due to usage changing point accuracy are eliminated.

Orifice meters can be calibrated at any pressure, on site. Errors of measurement due to factory calibration of the orifice plate are eliminated. Errors of measurement due to the orifice plate factor are eliminated. Errors of measurement due to a specific pressure which results in a pressure factor which is different from the one assumed in AGA 3 are eliminated.

The addition of sonic monitors to a gate station is simple, compact and requires a minimum amount of piping. Investment in high-pressure facilities for precalibration is eliminated. The expense and lead cycle of high pressure precalibration is eliminated. Meters designed to automatically adjust for accuracy changes due to usage are an unnecessary expense. The capital cost and expense of operating transfer provers is eliminated.

Accordingly, there have been disclosed arrangements for mounting a critical flow device for use in on-site meter calibration. It is understood that the above-described embodiments are merely illustrative of the application of the principles of this invention. Numerous other arrangements may be devised by those skilled in the art without departing from the spirit and scope of this invention, as defined by the appended claims.

I claim:

1. In combination:
   a valve having an inlet and an outlet;
   a sonic nozzle; and
   means for mounting said sonic nozzle in said valve so that when said valve is closed to otherwise block flow from said inlet to said outlet said sonic nozzle is in position so that all flow is directed from said inlet to said outlet through said sonic nozzle; said valve is an axial flow valve having an expandable sleeve of resilient material positioned within a housing on a pair of slotted cage members of conical shape and said mounting means is arranged to support said sonic nozzle substantially along the central axis of said valve to provide a flow path therethrough independent of the state of said sleeve.

2. The combination according to claim 1 wherein said mounting means is arranged to allow flow through said sonic nozzle when said valve is open as well as when said valve is closed.

3. The combination according to claim 1 wherein said mounting means further includes means for fastening the cage members of said valve.

4. The combination according to claim 1 wherein said mounting means further includes means for accommodating selected sizes of sonic nozzles.

5. The combination according to claim 4 wherein said accommodating means includes an adaptor means for fastening the cage member of said valve and means within said adaptor means for holding a sonic nozzle.

* * * * *